July 16, 1940.  J. D. EISLER  2,208,147

PHOTOELECTRIC INCLINOMETER

Filed Aug. 26, 1938  2 Sheets-Sheet 1

INVENTOR
Joseph D. Eisler
BY
Geo. L. Parkhurst
ATTORNEY

July 16, 1940.   J. D. EISLER   2,208,147
PHOTOELECTRIC INCLINOMETER
Filed Aug. 26, 1938   2 Sheets-Sheet 2

INVENTOR
Joseph D. Eisler
BY Geo. L. Parkhurst
ATTORNEY

Patented July 16, 1940

2,208,147

UNITED STATES PATENT OFFICE 2,208,147

PHOTOELECTRIC INCLINOMETER

Joseph Daniel Eisler, Tulsa, Okla., assignor to Stanolind Oil and Gas Company, Tulsa, Okla., a corporation of Delaware Application August 26, 1938, Serial No. 226,970

5 Claims. (Cl. 33—205)

In well drilling operations it is often necessary to determine the deviation of a bore hole from the vertical and to determine the location of the bottom of the hole with reference to the surface geography.

This type of survey is necessary to insure that the operator does not allow the well to drift in such manner that oil is removed from adjacent properties. Also such surveys are necessary where controlled deviations known as whip-stock drilling is practiced.

The usual device used for ascertaining the angular deviation and direction of the bore hole is the photographic type of instrument which is lowered to a predetermined depth into the hole and after a sufficient length of time for the instruments to come to rest, a photographic image of a compass and pendulum is made which when developed shows the angular deviation and direction at that point. In the usual type of instrument it is necessary to pull the device to the top of the hole to remove the film and reload after each exposure, although some types are equipped with a film feed so that several shots may be taken without removing the instrument from the well.

In order to obtain accuracy in computations for drift it is necessary to take a large number of readings involving considerable time and expense thereby.

This invention relates to apparatus and a method of survey that provides a continuous record of the inclination and direction down the bore hole so that greater accuracy is accomplished at a considerable saving of time in the operation of measuring these characteristics.

Essentially the apparatus consists of a compass and a pendulum arranged so as to operate shutters which admit a quantity of light to two photoelectric cells whereby one cell receives an amount of light dependent on the deviation of the direction of inclination relative to a fixed direction as set by a compass and the other cell receives an amount of light dependent on the deviation of the hole from a vertical axis. The amounts of light falling on the cells are read by means of suitable electrical meters or recording devices connected to the cells.

It is an object of my invention to provide a new and simple method and apparatus for surveying the inclination or direction of a bore hole or preferably both inclination and direction.

Another object is to provide a novel instrument for making a continuous and automatic record of the inclinations and directions of such inclinations so that accurate computations can be made of the position of the bore hole at any depth.

Other objects, advantages, and uses of my invention will be apparent from the following detailed description read in connection with the drawings in which.

Figure 1:
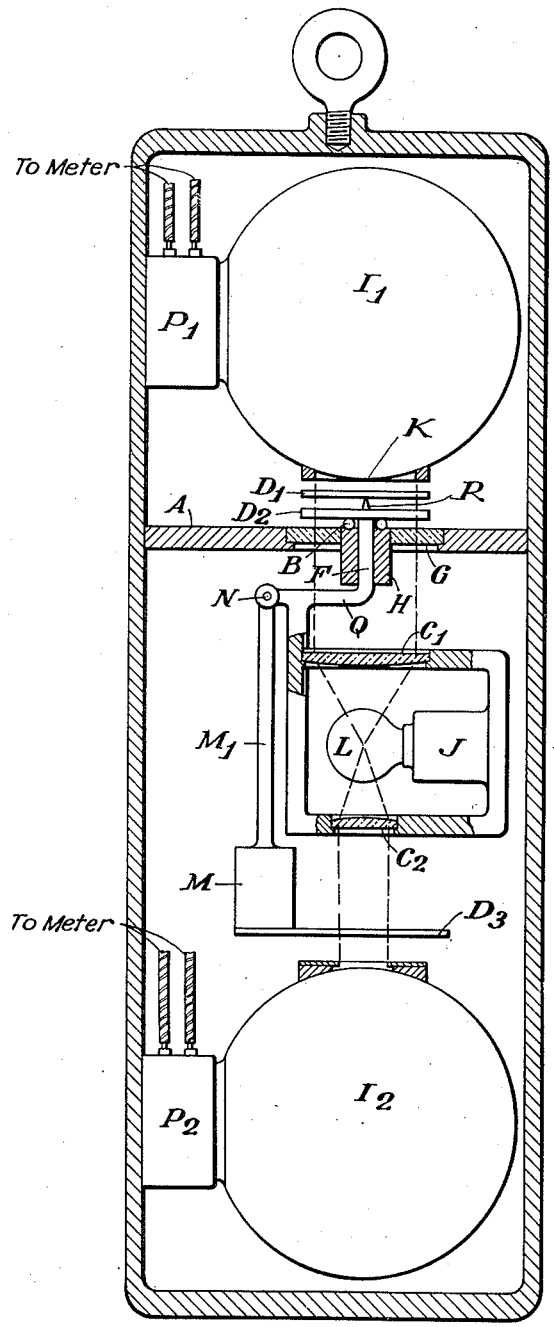
Figure 1 shows an elevation, partly in section of a preferred form of inclinometer instrument in accordance with my invention.

The operation of the device can be best understood by reference to Figure 1 where $P_1$ is the photoelectric cell and $I_1$ is the integrating sphere which by the well known laws of optics sums up all the light entering the sphere by the way of opening K and impresses it upon the photoelectric cell by means of another opening immediately in front of the photoelectric cell $P_1$. The photoelectric cell in this instance is what is known as a photronic or barrier cell which is a copper oxide device that generates a current of electricity proportional to the quantity of light impressed on the cell. Of course other types of photoelectric cells can be utilized for the purposes of this invention; however, the simplicity of the barrier type of cell requiring no batteries or external amplifying circuit makes it particularly adaptable to the purposes at hand.

Figure 2:
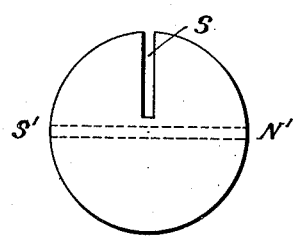
Figure 2 shows a plan view of the compass disc of the apparatus shown in Figure 1.
Figure 3:
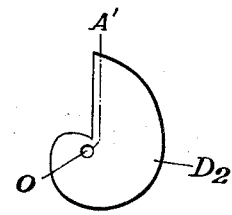
Figure 3 shows the upper light shutter which in connection with the compass disc admits light in accordance with the direction of inclination.

Light enters the integrating sphere $I_1$ from lamp L and condensing lens $C_1$ through opening K in the bottom of the sphere Interposed between the opening K of the integrating sphere $I_1$ and the source of light L are two discs $D_1$ and $D_2$. Plan views of these discs are shown in Figure 2 and Figure 3 respectively.

Disc $D_1$ is magnetized to act as a compass needle with poles N' and S' or it may carry a separate compass needle. This disc is pivoted in the center so that it is always free to assume a position in accordance with the forces imposed by the earth's magnetic field. Disc $D_1$ also carries a slot S which, due to the compass needle action, always occupies the same position with reference to the azimuth.

Disc $D_2$ carries on its top side a pivot R for supporting the compass disc $D_1$ and is mounted on a shaft F on its lower side.

Shaft F connects disc $D_2$ rigidly to lamp support J and arm Q which carries on its outer end pendulum arm $M_1$ and pendulum mass M.

Pendulum arm $M_1$ is supported by pivot N and the whole assembly of pendulum, optical system and disc $D_2$ is free to rotate about axis F on ball bearing B.

The pendulum mass M is made sufficiently great that when the apparatus is tilted the whole pendulum, optical system and disc $D_2$ rotate under the force of gravity acting upon mass M so that M is at the lowest point in the plane described by any point on M rotating about the axis of shaft F.

Thus disc $D_1$ assumes a position in accordance with the compass direction and disc $D_2$ assumes a position with reference to the direction of the slope of the bore hole, so that the amount of light passing through the openings of these two discs is a function of these two quantities.

Bearing H is mounted in a sheet of plate glass G which in turn is supported by shelf A. This type of mounting permits light from lamp L to reach the plane of discs $D_2$ and $D_1$.

Support arm Q is mounted in the plane of dotted line O—A' (Figure 3) which is that section of the disc which excludes all the light from integrating sphere $I_1$ and this arm therefore does not interfere with the operation of the device when so placed.

In effect disc $D_1$ due to the action of the compass needle acts as though it were fixed in space and disc $D_2$ rotates below it in accordance with the direction of the hole deviation.

Therefore, the light which is allowed to pass these two shutters is a measure of the direction of the deviation of the bore hole when proper calibrations are made. This is illustrated by Figures 5, 6, 7 and 8 where the plans of the superimposed discs are shown for four different directions of deviation, East, North, West and South, respectively.

Figure 5:
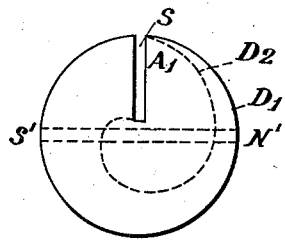
Figure 5 shows the positions of the two upper light discs for an East deviation of the bore hole.
Figure 6:
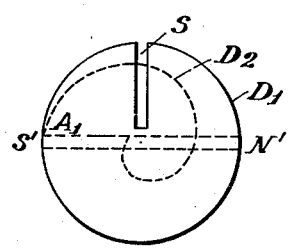
Figure 6 shows the positions of the two upper light discs for a North deviation of the bore hole.
Figure 7:
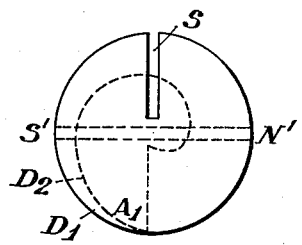
Figure 7 shows the positions of the two upper light discs for a West deviation of the bore hole.
Figure 8:
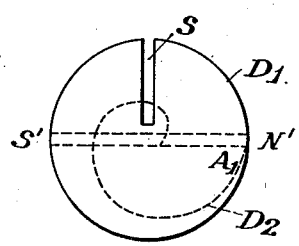
Figure 8 shows the positions of the two upper light discs for a South deviation of the bore hole.

With the arrangement of the magnetic poles and slot on disc $D_1$ as illustrated and remembering that the pendulum mass is fastened at a point opposite the point $A_1$ on disc $D_2$ on each of these drawings it can be seen readily that maximum light will be admitted when the lower disc $D_2$ is in the position shown by Figure 5 which corresponds to a bore hole deviating in an eastward direction.

Figure 9:
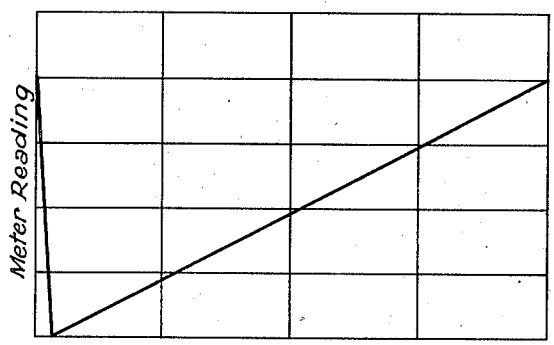
Figure 9 shows a calibration chart whereby direction of deviation can be read as a function of photoelectric cell output.

In fact if other positions are analyzed in a similar manner a curve can be plotted as shown in Figure 9 where the output of the photoelectric cell as indicated by a current meter is a measure of the direction of the bore hole deviation.

Figure 4:
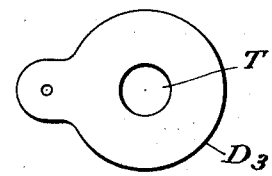
Figure 4 shows a lower light shutter which admits light proportional to the amount of inclination of the device shown in Figure 1.

The pendulum consisting of mass M and arm $M_1$, of course, hangs vertical at all times. This pendulum carries shutter $D_3$ (Figure 4 which regulates the amount of light entering the lower integrating sphere $I_2$ in accordance with the angular position of the instrument case relative to the vertical axis. Thus with the arrangement shown when the case is vertical the maximum amount of light enters the integrating sphere $I_2$ from lamp L and condensing lens $C_2$ through opening T; however, if the instrument case is inclined the pendulum swings away from the vertical axis of the instrument carrying the shutter with it so that some of the light is shut off from entering the integrating sphere.

As the light reaching the photoelectric cell $P_2$ will be a function of the angle between the pendulum mass and instrument case, which latter is parallel to the bore hole axis, a calibration can be made by reading the current output of the photronic cell $P_2$ at various known angles of the instrument with reference to the vertical axis. Such readings can be tabulated or plotted in the form of a curve for the purpose of determining the unknown angles of deviation of the bore hole after a survey with this instrument.

The outputs from photronic cells $P_1$ and $P_2$ can be read at intervals of known distances down the bore hole and computations made as to the path of the hole through the space below the surface of the earth or recording meters can be attached to the output circuits of the instrument and the paper upon which the record is made can be driven by methods of coupling well known in the art, so that the amount of paper passing the recording point is proportional to the depth of the measuring instrument below the surface of the earth. Such records will be automatic and show the exact point at which a hole starts to deviate from the vertical or other changes of interest so that more accurate computations can be made.

Where photronic or barrier cells are selected for uniformity of response to light over the entire surface used the integrating spheres may be dispensed with and the cells mounted directly above and below the shutters at the same points at which the entry openings of the integrating spheres are shown in Figure 1.

Current for the lamp L can be provided by dry cells mounted on the lamp platform or some form of commutating device can be provided by any one skilled in the art. Neither of these arrangements is shown by the drawings.

It is, of course, understood that the dimensions and shape of the case for the instrument must be such that the axis of the instrument will correspond substantially to the axis of the bore hole being surveyed and that the usual mechanical conditions relative to resistance to the entry liquids encountered in the bore holes and mechanical strength to withstand pressures are fulfilled.

It is also understood that the wires connecting the photocells to the instruments at the surface of the ground must meet similar requirements as to mechanical protection and electrical insulation.

While I have described my invention in connection with certain specific embodiments thereof, I do not desire to be limited thereto, but only by the scope of the following claims.

I claim:

1. An apparatus for testing the deviation of a bore hole which comprises a body adapted to be lowered into said bore hole, a carrier rotatably mounted within said body and weighted to possess a normally low side, a pendulum attached to said carrier, a light source, two photoelectric cells positioned within said body so as to receive light from said source, a first disc having a substantially spiral-shaped periphery adapted to rotate with said carrier, a second disc having a radial slot therein superimposed upon said first disc and adapted to maintain a constant position with respect to the magnetic pole, said discs being interposed between said light source and one of said photoelectric cells, and means for adjusting the quantity of light impinging on the other of said cells in accordance with the position of said pendulum with respect to the vertical.

2. An apparatus for testing the deviation of a bore hole which comprises a body adapted to be lowered into said bore hole, a carrier rotatably mounted within said body and weighted to possess a normally low side, a pendulum attached to said carrier, a light source mounted on said carrier, two photoelectric cells positioned within said body so as to receive light from said source, a first disc having a substantially spiral-shaped periphery adapted to rotate with said carrier, a second disc having a radial slot therein superimposed upon said first disc and adapted to maintain a constant position with respect to the magnetic pole, said discs being interposed between said light source and one of said photoelectric cells, and a shutter carried by said pendulum and interposed between said light source and the other of said cells, said shutter being adapted to vary the quantity of light impinging on said last-mentioned cell in accordance with the position of said pendulum with respect to the vertical.

3. In apparatus for testing the deviation of a bore hole or the like, the combination which comprises a body adapted to be lowered into said bore hole, a carrier rotatably mounted within said body and weighted to possess a normally low side, a light source, a photoelectric cell positioned within said body so as to to receive light from said source, a first disc having a substantially spiral-shaped periphery, and a second disc having a radial slot therein, one of said discs being adapted to rotate with said carrier, the other of said discs being adapted to maintain a constant position with respect to the magnetic pole and both of said discs being interposed between said light source and said photoelectric cell.

4. An apparatus for testing the deviation of a bore hole which comprises a body adapted to be lowered into said bore hole, a carrier rotatably mounted within said body and weighted to possess a normally low side, a pendulum mounted upon said carrier, two photoelectric cells, means for supplying a quantity of light to one of said cells in accordance with the position of said pendulum with respect to the vertical, and means for supplying a quantity of light to the other of said cells in accordance with the position of said carrier with respect to the magnetic pole, said last-mentioned means including a shutter assembly comprising a first disc having a substantially spiral-shaped periphery and a second disc having a radial slot therein, one of said discs being adapted to rotate with said carrier and the other of said discs being adapted to maintain a constant position with respect to the magnetic pole.

5. Apparatus according to claim 4 including an integrating sphere associated with each of said photoelectric cells and arranged so that said light supplied to each cell enters said integrating sphere and is transmitted therefrom to said cell.

JOSEPH D. EISLER.